(12) United States Patent
Magee et al.

(10) Patent No.: US 7,884,170 B2
(45) Date of Patent: Feb. 8, 2011

(54) STABLE ETHYLPOLYSILICATES WITH GREATER THAN FIFTY PERCENT AVAILABLE SIO$_2$ AND METHODS FOR MAKING THE SAME

(75) Inventors: Walter L. Magee, Manitou Beach, MI (US); Adam W. Emerson, Weston, MI (US); Wallace G. Joslyn, Adrian, MI (US); Richard S. Odneal, Morenci, MI (US)

(73) Assignee: Silbond Corporation, Weston, MI (US)

( * ) Notice: Subject to any disclaimer, the term of this patent is extended or adjusted under 35 U.S.C. 154(b) by 21 days.

(21) Appl. No.: 12/136,403

(22) Filed: Jun. 10, 2008

(65) Prior Publication Data

US 2009/0306326 A1     Dec. 10, 2009

(51) Int. Cl.
*C08G 77/02*     (2006.01)

(52) U.S. Cl. .................. 528/39; 556/428; 106/38.2
(58) Field of Classification Search ............ 528/39
See application file for complete search history.

(56) References Cited

U.S. PATENT DOCUMENTS

RE30,284 E  *  5/1980  Magee, Jr. .................. 556/428

* cited by examiner

*Primary Examiner*—Ling-Siu Choi
*Assistant Examiner*—Chun-Cheng Wang
(74) *Attorney, Agent, or Firm*—Dickinson Wright PLLC

(57) ABSTRACT

A stable MQ resin solution with over 50% SiO$_2$ and having viscosity of 50 cps at 25° C. to about 750 cps at 25° C. and which is essential free of monomer is disclosed. The stable resin solution is made by a two step addition of catalysts wherein a hydrolysis catalysts, as for example, hydrochloric acid is added initially and a second catalysts such as Phosphonitrilic chloride trimer is added subsequently.

7 Claims, 8 Drawing Sheets

STABLE ETHYLPOLYSILICATES WITH GREATER THAN FIFTY PERCENT AVAILABLE SIO₂ AND METHODS FOR MAKING THE SAME

FIELD OF THE INVENTION

This invention relates to stable ethylpolysilicates with 50% or more available $SiO_2$ and methods of making such polymers, and more particularly to a hydrolyzed tetraethyl orthosilicate containing from at least 50% by weight silica expressed as weight percent $SiO_2$ and to methods for producing the same.

BACKGROUND FOR THE INVENTION

Tetraethyl orthosilicate is a major chemical compound with a formula $Si(OC_2H_5)_4$. The compound is frequently abbreviated as TEOS and consists of four ethyl groups attached to an $SiO_4$ ion that is referred to as an ortho silicate. TEOS can also be considered to be the ethyl ester of orthosilicic acid, $Si(OH)_4$ and is a prototypical alkoxide. TEOS is a tetrahedral molecule with many analogues most of which are prepared by alcoholysis of silicon tetrachloride.

Typically TEOS is hydrolyzed and condensed with mineral acid catalysts such as hydrochloric acid or sulfuric acid. TEOS is mixed with sufficient alcohol to allow its reactant water to be partially miscible in the presence of an acid catalyst. This allows the initial reaction to take place where one of the ethoxy groups is replaced by a water molecule liberating ethanol as a by-product. This is illustrated by the following diagram:

$$Si(OC_2H_5)_4 + H_2O \rightarrow (C_2H_5O)_3SiOH + C_2H_5OH$$

The condensation of silanol groups derived from the hydrolysis reaction is a competing reaction in the presence of acid catalyst. This is illustrated by the following diagram:

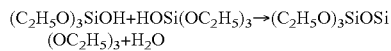

$$(C_2H_5O)_3SiOH + HOSi(OC_2H_5)_3 \rightarrow (C_2H_5O)_3SiOSi(OC_2H_5)_3 + H_2O$$

Thus the polymerization of TEOS with water in the presence of a catalyst results from sequential hydrolysis of ethoxy groups and condensation of silanol groups in this over simplified view. In fact, there are other reactions, such as condensation of silanol with ethoxy groups that provide equivalent polymerization. All these processes result in polymers of increasing complexity, variety in physical properties, and usefulness in their intended applications.

Typically these polymers are thought of as combinations of linear, cyclic and polycyclic polymers. Physical properties such as viscosity, viscosity stability, and available silica ($SiO_2$ wt %), are dependent on the amount of water reacted with the TEOS. This is expressed as a percentage of the theoretical amount of water to replace all the ethoxy groups bound to silicon. The stoichiometric amount of water is 2 moles of water to 1 mole of TEOS. This is referred to as 100% hydrolysis. When reacted with this amount of water, the resulting polymer has the physical properties of amorphous silica. This can be observed by reacting TEOS with 2 moles of water and then removing the by product ethanol by distillation. What remains is a solid material with a high percentage of silica remaining in the composition, typically 98% or higher. In practice it has been found that in order to obtain usable physical properties, a flowable liquid, only 40% of the theoretical water is added and then the by-product ethanol is removed. This results in a low viscosity liquid that contains 40% available $SiO_2$ by weight. This material has become an item of commerce, known as Silbond 40 or Dynasil 40.

Tetraethyl orthosilicate also has many applications because of its easy conversion into silica. For example, it may be used for chemical mechanical polishing as outlined in a Negrych et al. U.S. Pat. No. 6,334,880 that is assigned to Silbond Corporation, the same Assignee as the present application. Another application relates to the synthesis of trimethylsiloxypolysilicates (MQ Resins) that are useful as additives for release coatings in pressure sensitive adhesive applications and liquid silicone rubber. The role of MQ Resins in such formulations is to modify the properties of the cured silicone rubber. The silicone rubber is hardened by this component to a higher modulus. For pressure sensitive release applications this increases the release forces of the adhesive. In both applications, the presence of the low molecular weight MQ Resins is detrimental.

A further application for TEOS where polymer distribution with reduced amounts of low molecular weight material are desired relates to the formation of polysilicate binders for zinc rich coatings, investment casting, refractory, sand core, and ceramic articles in general. These applications are well know in the prior art for ethyl polysilicates. A developing limitation for all these applications is the amount of low boiling alcohol by-product that is liberated during the further hydrolysis of ethylpolysilicate. This raises the amount of volatile organic components (VOC) present in the user's formulation. More environmentally friendly compositions that still meet the requirements of the user are desired. For example, 40% hydrolyzed ethylpolysilicate releases 2.4 moles of ethanol per equivalent of polymer, a restricted VOC component, while a 70% hydrolyzed ethylpolysilicate releases only 1.2 moles of ethanol per equivalent of polymer, a 50% reduction.

BRIEF SUMMARY OF THE INVENTION

In essence the present invention contemplates a stable ethylsilicate polymer in liquid i.e. flowable form. The polymer includes between 50 to 60% by-weight silica and preferably between 53% and 55% $SiO_2$ by weight and has a viscosity of about 10 cps at 25° C. and up to about 1,000 cps at 25° C.

In a preferred embodiment of the invention, the polymer is essentially free or completely free of monomer and remains in a flowable state for up to one year or more. In the preferred embodiment the polymer consists of about 55% plus or minus 2% $SiO_2$ by weight.

The invention also contemplates a method for making stable ethylsilicate polymer in liquid or flowable form with between about 50% to about 60% by-weight silica and a viscosity between about 10 cps at 25° and up to about 1000 cps at 25°. To be more specific the polymers are essentially free of monomer. The method includes the step of providing a mass of TEOS monomer as for example a Silbond condensed (28% $SiO_2$ TEOS monomer) and hydrolyzing the TEOS with a hydrolyzing catalyst as for example a mineral acid namely hydrochloric acid or sulfuric acid. In a preferred embodiment of the invention ethanol was added to the TEOS monomer with a mineral acid catalyst. Then the mixture was heated to about 72° C. and acidified water added over a period of time. After completion of the water addition, a second catalyst step includes the addition of a condensation catalyst as for example 99% phosphoronitrilic chloride trimer. The mixture is stirred at reflux at about 2 hours and all of the alcohol removed by distillation.

Phosphonitrilic chloride (PNC) has been reported to be a catalyst for condensation polymerization of silonal terminated polydimethylsiloxane and is active in various forms. However, Applicant found no references to the use of PNC catalysts in connection with ethylpolysilicates.

It has now been discovered that the combination of a mineral acid catalyst and PNC catalyst in a two step process produces hydrolysis amounts up to about 70%, lower viscosity and an unusually high level of viscosity stability. It has also been found that the molecular distribution as indicated by gel permeation chromatography is different. The difference is a narrower distribution that is shifted to smaller size molecules.

The invention will now be described in connection with the accompanying drawings.

DESCRIPTION OF THE PREFERRED EMBODIMENTS OF THE INVENTION

Figure 1:
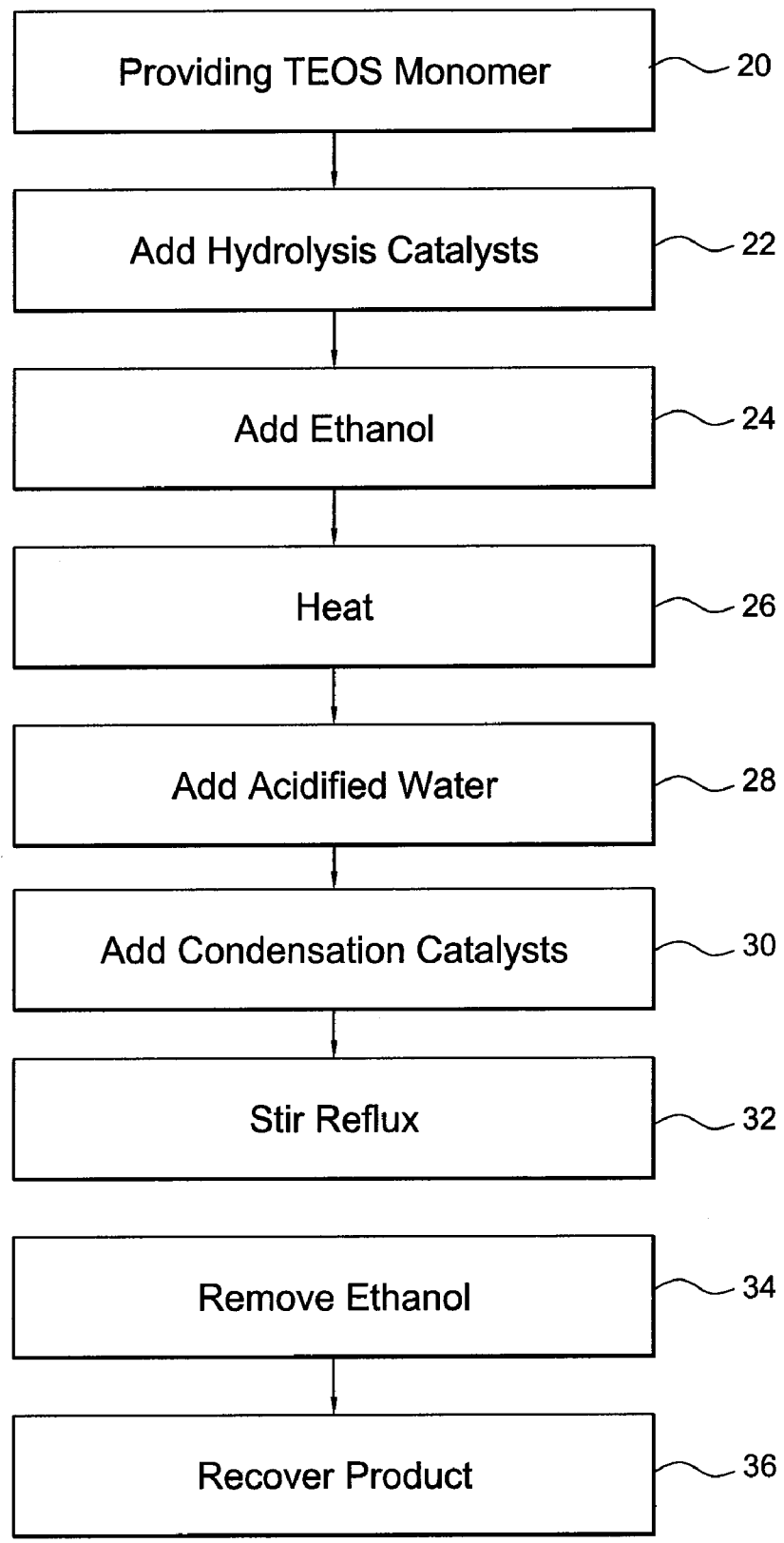
FIG. 1 is a flow chart illustrating a process for making a stable ethylsilicate polymer with 50% to 60% available $SiO_2$ by weight in accordance with the present invention.

A process for making a stable ethylsilicate polymer in liquid form with an available $SiO_2$ content of between about 50% by-weight and 60% by-weight will now be described in connection with FIG. 1. The stable polymer has a viscosity of about 50 to 70 cps at 25° C. and remains in liquid form for a period of about a year. To be more specific, the polymer has a viscosity of less than 1000 cps after heating to 55° C. and remaining at that temperature for 20 days.

The process includes the step 20 of providing a mass of TEOS as for example Silbond® condensed (28% $SiO_2$, TEOS monomer) a product of Silbond Corporation of Weston, Mich. A hydrolysis catalyst is added to the TEOS in step 22. For example in a laboratory two drops of a mineral acid (37% HCl) were added to 780 grams of monomer. 200 proof ethanol was added in step 24 and the mixture headed to about 72° C. in step 26. Then, water acidified with two drops of mineral acid, preferably 37% HCL were added over a preselected time as for example 1 hour in step 28. After completion of step 28, a condensation catalyst as for example Phosphononitrilic chloride trimer was introduced into the mixture in step 30. In step 32 the mixture was stirred at reflux for about 2 hours and all of the ethanol was removed by heating in step 34. The temperature increased from 80° C. to about 140° C. over a about three hours. The ethanol was collected by distillation and a clear stable silicate ester mixture recovered in step 36.

Examination of 40% hydrolyzed compositions reveals that they are distributions of various individual components. For example, gas chromatography of the liquid material shows that the material is a mixture of TEOS, dimer, trimer, tetramer and so forth. These linear structures have been characterized by mass spectral analysis. This analysis method only separates volatile components. Other methods, such as gel permeation chromatography, reveal more complicated distributions. This method separates components based on their molecular size. 40% hydrolyzed TEOS polymers are complex mixtures ranging from lower oligomeric components such as dimer, trimer, tetramer to more complicated cyclic and polycyclic structures. The size of these components can range from thousands of molecular units to tens of thousands of molecular units.

As the hydrolysis amount is increased, the physical properties of the resulting polymer change. Increasing hydrolysis level to 50% hydrolysis, doubles viscosity, increases silica content to 45% and shifts the molecular weight distribution to higher molecular weight components. Viscosity stability becomes an increasingly important issue. Viscosity stability is a function of the amount of uncondensed silanol remaining in the polymer structure. If the amount of silanol is too high, the viscosity of the resulting polymer increases with time, causing increasing thickening of the polymer.

At hydrolysis amounts of 70% or higher, when using mineral acids as catalyst, the viscosity and the viscosity stability of the resulting isolated polymer become impractical. This means that the polymer does not flow properly and after standing for several days, the polymer does not flow at all, becoming an intractable gelled mass.

When Phosphonitrilic chloride is used at the hydrolysis amounts of 70%, low viscosity polymers (50 cps) at 25° are produced that show remarkable viscosity stability. The molecular distribution as indicated by gel permeation chromatography is also different. The distribution is narrow and shifted to smaller size molecules.

Phosphonitrilic chloride comes in many forms. The most common of which is cyclic trimer. This material is commercially available and produces low viscosity polymer. The prior art describes various linear Phosphonetrilic chloride polymers which also work in an equivalent way.

The following is an example of a preparation of these low viscosity ethylpolysilicates that are produced using a two step addition of catalysts wherein one step is Phosphonetrilic chloride catalyst:

EXAMPLE 1

A 2 liter four necked round bottom flask, equipped with a central stirrer, thermometer, Claisen take off adaptor, and addition funnel, is charged with 780 grams of Silbond Condensed (28% SiO2, TEOS Monomer), 2 drops of 37% HCL, 125 grams of 200 proof ethanol. The mixture is heated to 72 C. To this hot stirring mixture is added 94.5 grams of water acidified with 2 drops of 37% HCL over a period of 1 hour. After completion of the addition of acidified water, 0.1 grams of 99% phosphoronitrilic chloride trimer (a condensation catalyst) was introduced. The mixture is stirred at reflux for 2 hours and then all ethanol was removed by heating. The temperature of the mixture increased from 80 C to 140 C over about 3 hours. 530 grams of volatile material was collected by distillation leaving 443 grams of a clear silicate ester mixture. The clear ethyl polysilicate mixture was stable even after heating at 55 C for 20 days, showing only a modest increase in viscosity from 100 cps to 200 cps. This is indicative of stability in excess of 6-12 months at room temperature.

Figure 2:
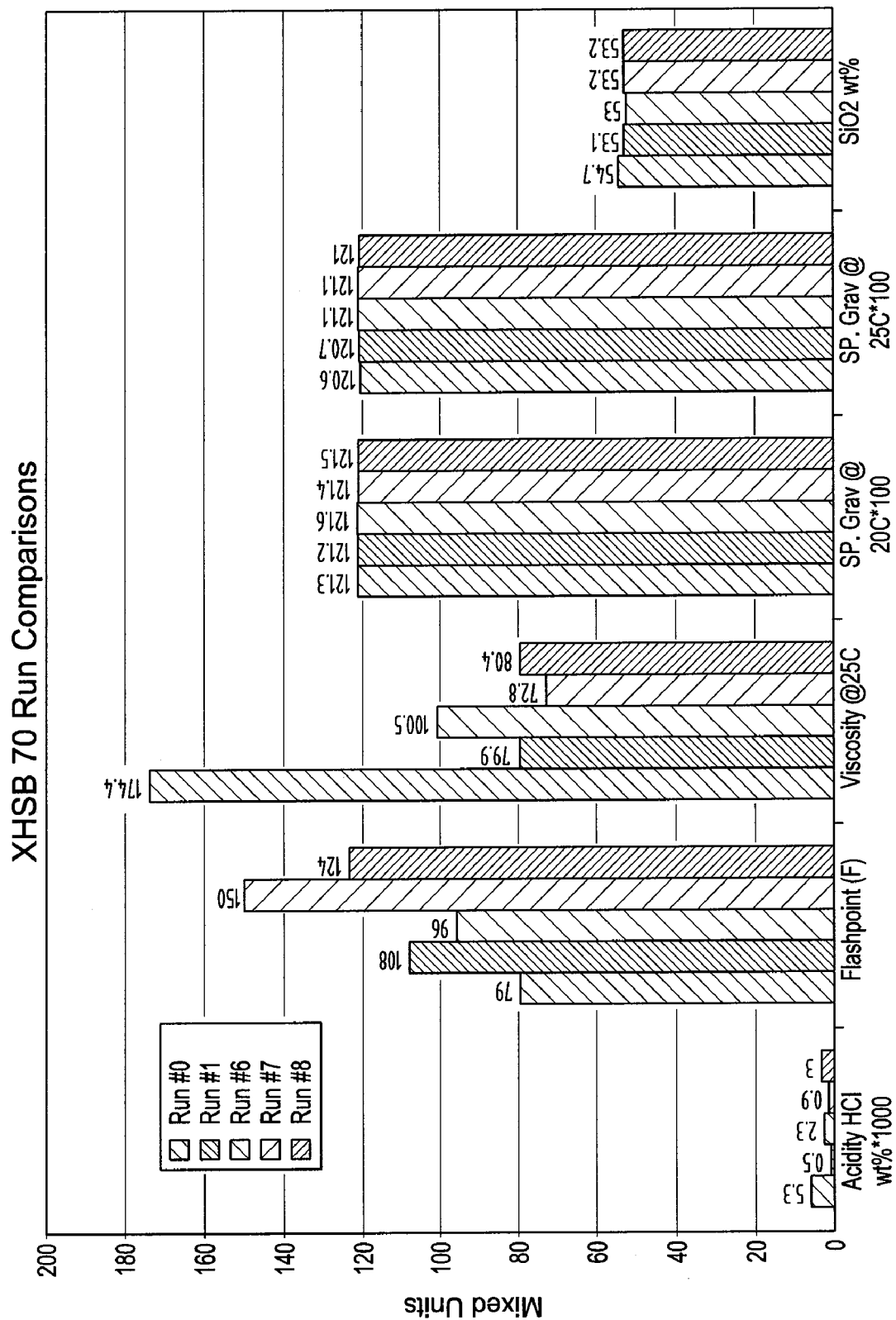
FIG. 2 is a graphical illustration showing the physical properties of several examples of ethylpolysilicate mixtures in accordance with a first embodiment of the present invention.

The graph shown in FIG. 2 shows results of multiple runs as set forth above.

EXAMPLE 2

No PNC

A 2 liter four necked round bottom flask, equipped with a central stirrer, thermometer, Claisen take off adaptor, and addition funnel, is charged with 780 grams of Silbond Condensed (28% SiO2, TEOS Monomer), 0.1 grams of methansulfonic acid, 125 grams of 200 proof ethyl alcohol. The mixture is heated to 76 C. To this hot stirring mixture is added 94.5 grams of water over ¼ hour. The mixture is stirred at reflux for 2 hours and then all ethanol was removed by heating. The temperature of the mixture increased from 80 C to 140 C over about 3 hours. 558 grams of volatile material was collected by distillation leaving 413 grams of a clear silicate ester mixture. This silicate ester mixture gelled on standing after 3 days.

Comparison of Molecular Distribution

Gel permeation chromatography separates molecular components according to size. By selecting a chromatography support with proper hole size, silicate oligomers are conveniently separated. This technique is used for quality control purposes for the production of Silbond 40, 40% hydrolyzed ethylpolysilicate. The individual species are retained on the instrument for longer time periods, depending on the molecular size of each species. In the series of components: TEOS, dimer, trimer, tetramer and higher homologs have decreasing retention times as the size of the molecule increases. A typical diagram for Silbond 40 is shown in FIG. 3.

Figure 3:
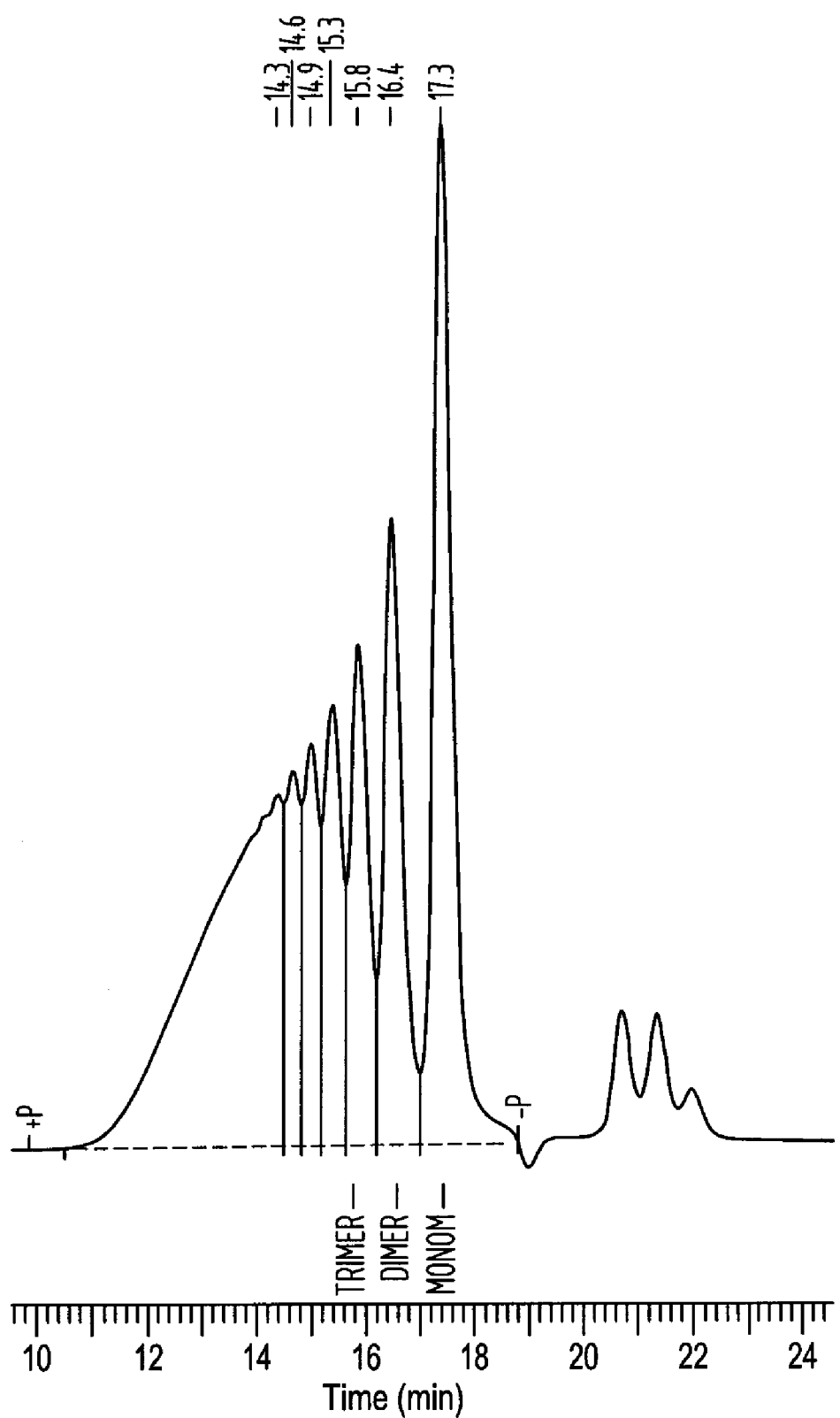
FIG. 3 is a gel permeation chromatograph of a Prior Art 40% hydrolyzed silicate polymer.

As shown in FIG. 3 a progression of linear oligomers starting with monomer (TEOS) with each of the higher homologs clearly separated. The distribution continues with multiple components forming a continuum of components of increasing molecular size but not separated individually.

Figure 4:
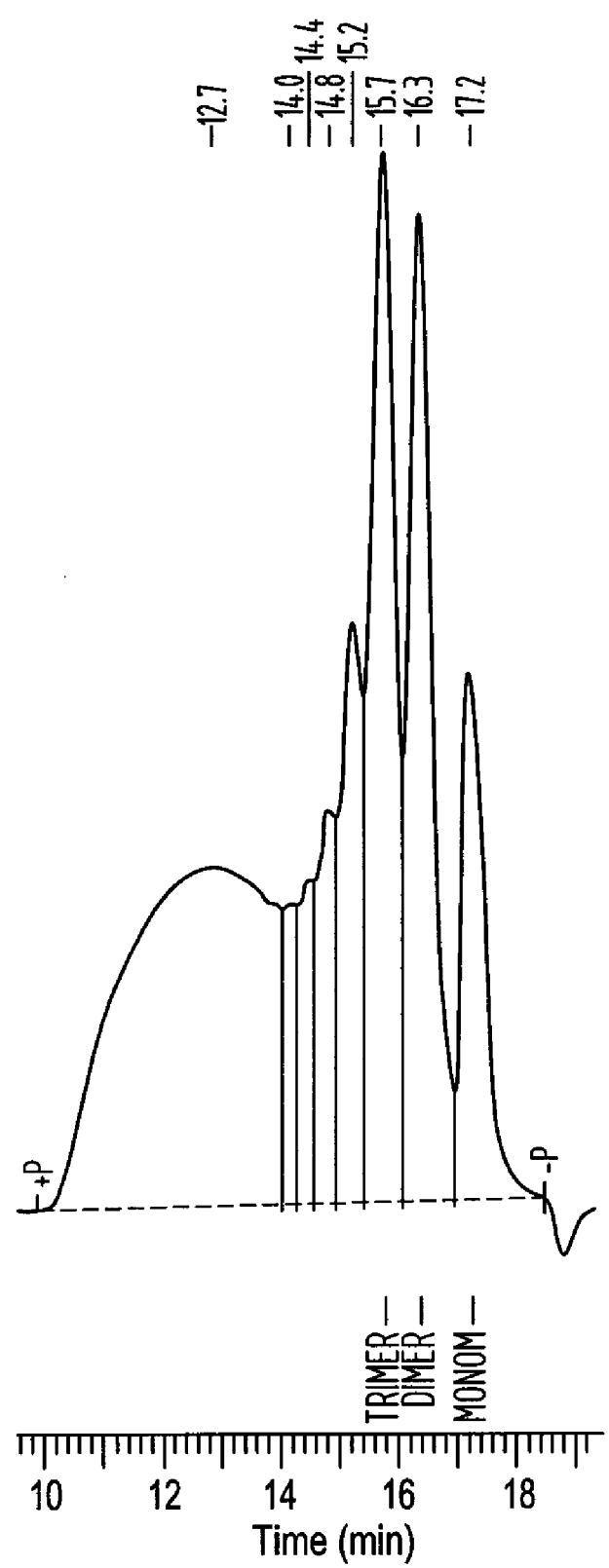
FIG. 4 is a gel permeation chromatograph of a 50% hydrolyzed silicate polymer.

The diagram of FIG. 4 shows the distribution of Silbond 50. In contrast to Silbond 40, the amount of linear oligomers is reduced however each is clearly still present. The high molecular size components are increase in amount compared to the Silbond 40 distribution.

Figure 5:
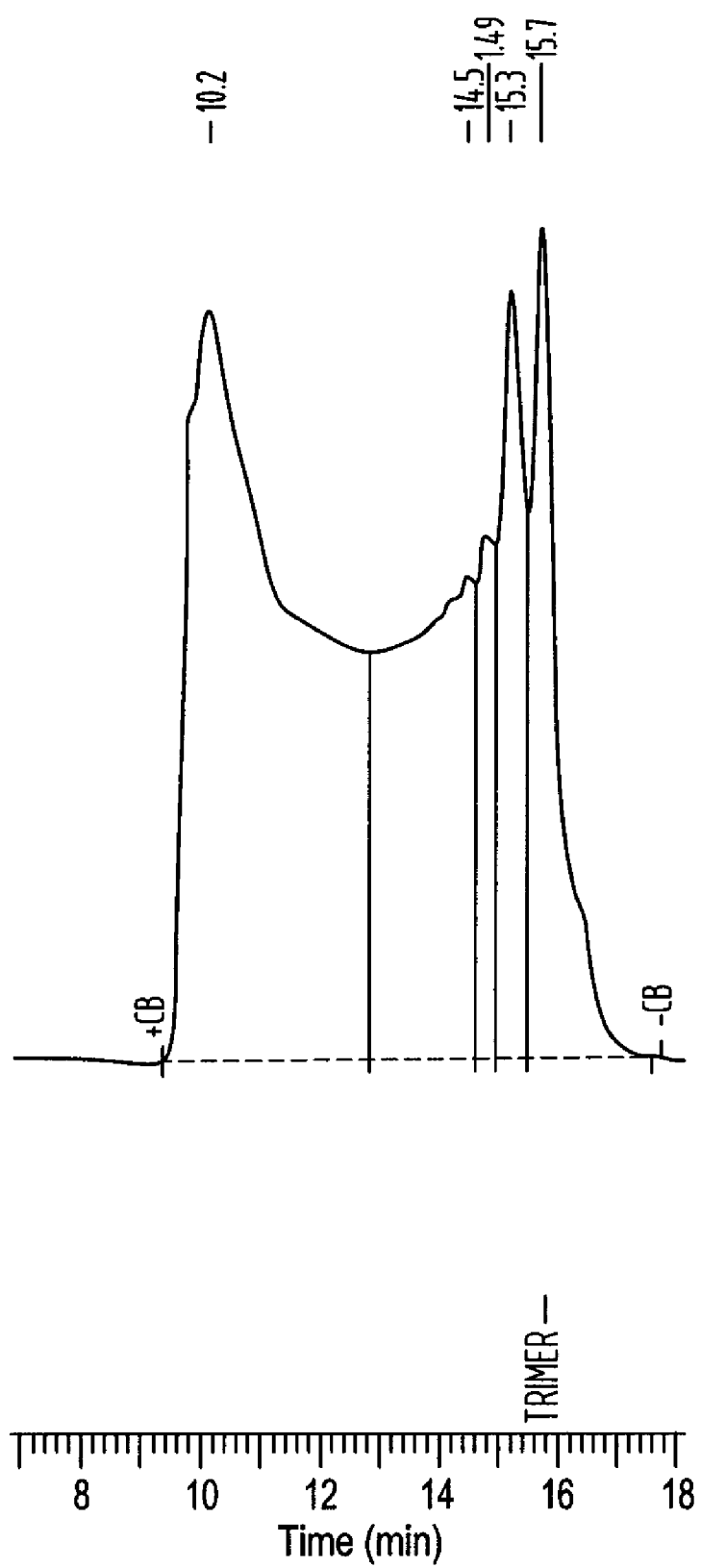
FIG. 5 is a gel permeation chromatograph of a 70% hydrolyzed polymer catalyzed with methansulfonic acid.

The distribution shown in FIG. 5 for 70% hydrolyzed polymer catalyzed with methansulfonic acid, the distribution shows reduced amounts of the shorter linear components and a dramatically higher molecular weight distribution. Detectable levels of small linear components remain evident. This distribution was unstable gelling after 3 days.

Figure 6:
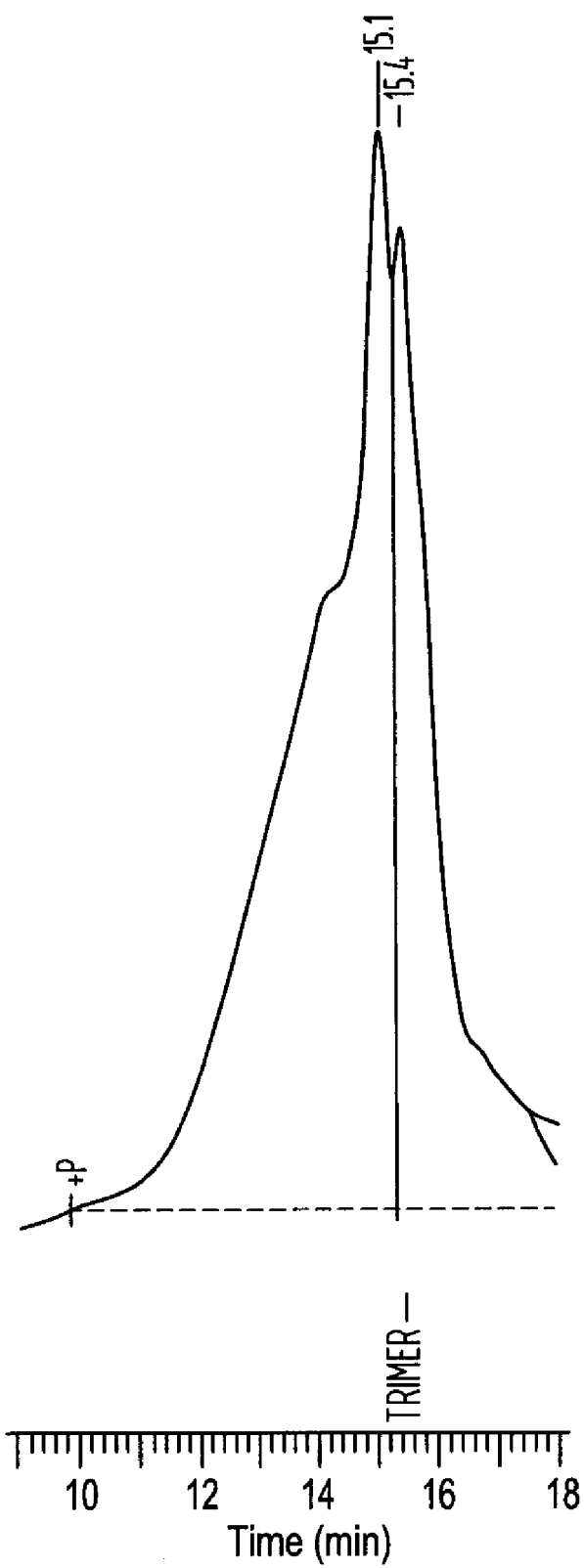
FIG. 6 is a gel permeation chromatograph of a 70% hydrolyzed polymer catalyzed with methansulfonic acid and a Phosphonetrilic chloride catalyst.

The distribution shown in FIG. 6 shows the molecular distribution that arises from using a two step additional catalysts wherein one of the catalysts is a Phosphonitrilic chloride catalyst.

In this distribution, low molecular weight oligomers are eliminated from the distribution. In addition, the amount of high molecular size material is also reduced even though the observed silica content was 54% SiO2 by weight. This material showed little change in distribution after 20 days stored at 55 C. This results in a molecular distribution that is better suited for many applications of ethylpolysilicates.

One application where these properties are preferred is the synthesis of MQ Resins. MQ Resins are useful as additives for release coatings in pressure sensitive adhesive applications and liquid silicone rubber. The role of MQ Resins in these formulations is modification of physical properties of a finally cured silicone rubber. The silicone rubber is hardened by this component to higher modulus. For pressure sensitive release application this increases the release force of the adhesive, therefore the MQ Resins are known as control of release additives causing the release force to increase with increasing amounts of MQ Resins. In liquid silicone rubber, the shore hardness of the rubber is increased, decreasing the deformability of the rubber. In both applications, presence of low molecular weight MQ Resins is a detriment to the applications. In particular, tetrakistrimethylsiloxysilicate (neopentamer) causes significant issue with silicone rubber formulations by introducing extractable low molecular species into the cured silicone rubber.

The GPC traces shown in FIGS. 5 and 6 compare MQ Resins from Silbond 40 and from MQ Resins prepared from high $SiO_2$ wt % PNC catalyzed ethylpolysilicate.

As is seen in the above diagrams, the amount of material below 16 minute retention time for the is negligible, where the amount of low size material in the Silbond 40 polymer is substantially more. This is an indication that migratory material present in the polymer distribution will be favorably reduced, by using the product of the present invention as a starting material.

A second application where polymer distributions with reduced amounts of low molecular weight material relates to zinc rich coatings. Ethylpolysilicates are a preferred binder for zinc dust for corrosion resistant coatings. This is well documented in the prior art. One of the developing limitations for this application is the amount of low boiling alcohol by product that is liberated during hydrolysis of ethyl silicate 40% hydrolyzed. This raises the amount of volatile organic components present in the coating formulation. Using more highly hydrolyzed ethylpolysilicates allows the formulator to design more environmentally friendly compositions that still meet the requirements of the marine coating industry. For a 40% hydrolyzed ethylpolysilicate, 74% of the mass potentially liberates ethanol, where as a 70% hydrolyzed polymer is only 53% of the mass is ethanol. This represents a 28% reduction in by product ethanol.

Figure 7:
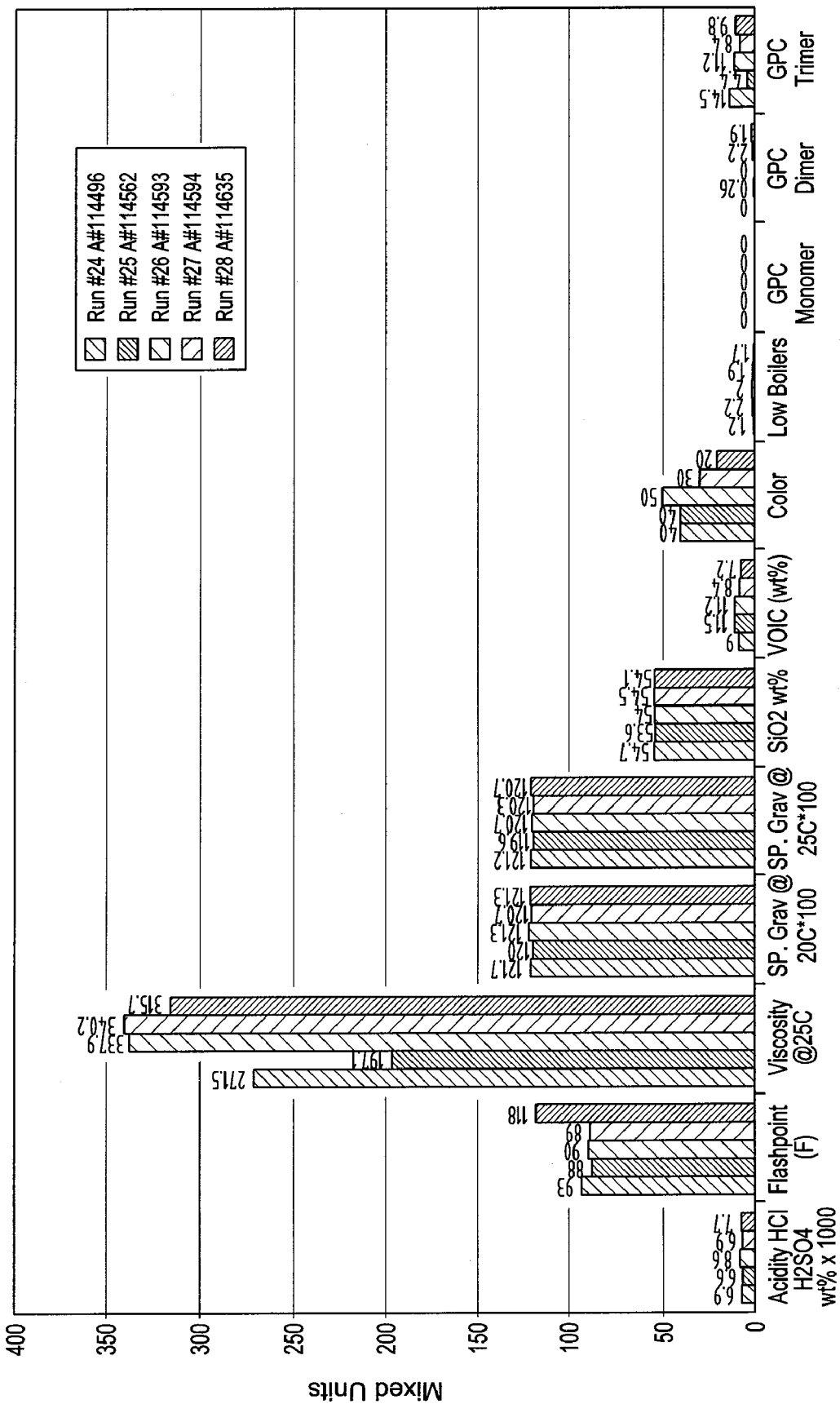
FIG. 7 is a graphical illustration showing the physical properties of five respective runs made in accordance with a second embodiment of the present invention.
Figure 8:
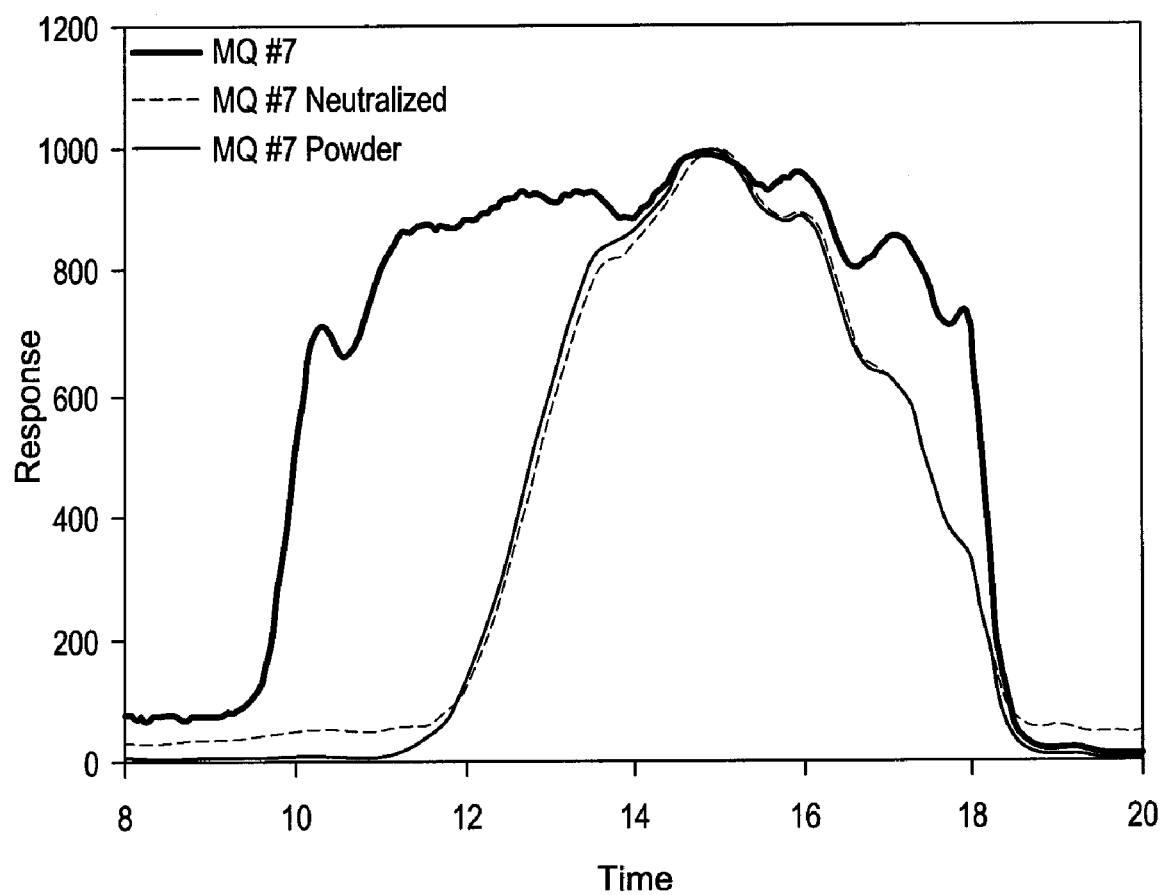
FIG. 8 is a graphical illustration showing a GPC of an MQ Resin.

A four necked 5 liter round bottom flask, equipped with a central stirrer, thermometer, Claisen take off adaptor, and addition funnel, is charged with 3120 grams of Silbond Condensed (28% SiO2, TEOS Monomer), 0.4 grams of methansulfonic sulfonic acid (150 ppm), 500 grams of SDA 29 denatured alcohol. The mixture is heated to 80 C. To this hot stirring mixture is added 378 grams of water. After completion of the addition of water, 0.4 grams of phosphonitrilic chloride trimer was introduced. The mixture is stirred at reflux for 2 hours and then all ethanol was removed by heating. The temperature of the mixture increased from 80 C to 140 C over about 3 hours. 2253 grams of volatile materials was collected by distillation leaving 1704 grams of a clear silicate ester mixture. Five repeated runs gave the data as shown in FIG. 7.

Without PNCl2

A four necked round bottom flask, equipped with a central stirrer, thermometer, Claisen take off adaptor, and addition funnel, is charged with 3120 grams of Silbond Condensed (28% SiO2, TEOS Monomer), 0.5 grams of methansulfonic acid, 500 grams of SDA 29 denatured alcohol. The mixture is heated to 80 C. To this hot stirring mixture is added 378 grams of water. The mixture is stirred at reflux for 2 hours and then all ethanol was removed by heating. The temperature of the mixture increased from 80 C to 140 C over about 3 hours. 2178 grams of volatile materials was collected by distillation leaving 1722 grams of a clear silicate ester mixture. This silicate ester mixture had a viscosity of 1188 cps and the mixture gelled on standing.

Preparation of Resins that Include Q Units

TEOS or ethylpolysilicate is frequently used as a component in silicone resin technology. One skilled in the art is familiar with the various classes of resins and combinations of them. Some examples are TQ resins, MQ resins, DQ resins, MQV resins, MQD resins and DTQ resins A significant complication in resin production is the amount of ethanol liberated during hydrolysis and copolymerization when using TEOS as a source of tetrafunctional silicon (Q units). Furthermore achieving molecular distributions that minimize or eliminate low molecular weight by-products such as tetrakistrimethylsilicate (neopentamer) are especially desirable. The following represents an example of the advantages of producing these resins with the polymers described in this invention.

The example below illustrates the utility of these new molecular distributions. MQ resins are silicate resins that have utility in silicone elastomers and pressure sensitive adhesives. A key measurement of the quality of these resins is the average molecular weight and content of tetrakistrimethylsilylsilicate.

A four necked round bottom flask, equipped with a central stirrer, thermometer, Claisen take off adaptor, and addition funnel, is charged with 835 grams of Silbond 55 (55% SiO2, silicate polymer, the material disclosed in this invention), 0.5 grams of methansulfonic acid, and 250 grams of SDA 29 denatured alcohol. The mixture is heated to 80 C. To this hot stirring mixture is added 155 grams of water. The mixture is stirred at reflux for 2 hours and then 500 grams of toluene, 324 grams of hexamethyldisiloxane are added. 800 grams of volatile material was removed to produce a 50% solids solution of MQ resin in solution. Analysis of the resin by gel permeation chromatography produced the following molecular distributions;

| Sample | Mp | Mn | Mw | Mz | PD |
| --- | --- | --- | --- | --- | --- |
| MQ powder | 34600 | 18000 | 51100 | 107000 | 2.8 |

The molecular distributions showed substantially higher molecular weight and the absence of low molecular weight trimethylsilylated species than reported in literature preparation of these materials. The molecular weight reported in an article in the J. Appl Polym Sci 70: 1753-1757, 1998 reported molecular weights of 4200 to 4956 and the molecular distribution indicated a large peak at long retention time indicating the presence of low molecular weight trimethylsilylated species such as tetrakistrimethylsilylsilicate.

Silbond 55 from PNC

A four necked 5 liter round bottom flask, equipped with a central stirrer, thermometer, Claisen take off adaptor, and additional funnel, is charged with 3120 grams of Silbond Condensed (28% SiO2, TEOS Monomer), 4 grams of PNCl2 prepared in Benzoyl Chloride Solution, 500 grams of SDA 29 denatured ethyl alcohol. The mixture was heated to 80 C. To this hot stirring mixture was added 378 grams of water. The mixture is stirred at reflux for 2 hours and then all ethanol was removed by heating. The temperature of the mixture increased from 80 C to 140 C over about 3 hours. 2300 grams of volatile materials were collected by distillation leaving 1690 grams of a clear silicate ester mixture.

While the invention has been described in connection with its preferred embodiments it should be recognized that changes and modifications may be made therein without departing from the scope of appended claims.

What is claimed is:

1. A stable ethylsilicate polymer in liquid form, said polymer comprising between about 50% by-weight and 60% by-weight silica, having a viscosity of about 10 cps at 25° C. and up to a viscosity of 1000 cps at 25° C. and remaining in liquid form after heating at 55° C. for 20 days and wherein said polymer is free of monomer.

2. A stable ethylsilicate polymer according to claim 1 in which the specific gravity is between about 1.19 and 1.22.

3. A stable ethylsilicate polymer according to claim 2 in which the molecular distribution includes molecular weights higher than 4956.

4. A stable ethylsilicate polymer according to claim 2 in which the molecular weight distribution is about Mp 34,600, Mn is about 18,000, Mw is about 51,100, Mz is about 10,700 and PD is about 2.8 and wherein Mp is the molecular weight at peak, Mn is the number average molar mass, Mw is the weight average molar mass, Mz is the average molar mass and PD is polydisparity.

5. A stable ethylsilicate polymer according to claim 2 which contains about 54% silica.

6. A stable ethylsilicate polymer as set forth in claim 1 formed by a processes that including using a phosphonitrilic chloride (PNC) catalyst.

7. A stable ethylsilicate polymer as set forth in claim 6 wherein the process includes adding a hydrolysis catalyst to a tetraethyl orthosilicate (TEOS) monomer prior to using the PNC catalyst.

* * * * *